(12) United States Patent
Fuji et al.

(10) Patent No.: US 7,538,176 B2
(45) Date of Patent: May 26, 2009

(54) POLYESTER POLYMER, ITS MOLDINGS, AND PRODUCTION METHOD OF THE POLYESTER POLYMER

(75) Inventors: Michiaki Fuji, Kyoto (JP); Yoshimi Ito, Hofu (JP)

(73) Assignee: Osaka Gas Co., Ltd., Osaka (JP)

( * ) Notice: Subject to any disclaimer, the term of this patent is extended or adjusted under 35 U.S.C. 154(b) by 210 days.

(21) Appl. No.: 10/547,350

(22) PCT Filed: Feb. 27, 2004

(86) PCT No.: PCT/JP2004/002420

§ 371 (c)(1),
(2), (4) Date: Jul. 12, 2006

(87) PCT Pub. No.: WO2004/078824

PCT Pub. Date: Sep. 16, 2004

(65) Prior Publication Data

US 2007/0106053 A1    May 10, 2007

(30) Foreign Application Priority Data

Mar. 3, 2003   (JP) ............................. 2003-055250

(51) Int. Cl.
*C08G 63/00* (2006.01)
*C08G 63/02* (2006.01)

(52) U.S. Cl. .................................................. 528/190

(58) Field of Classification Search ............. 264/176.1, 264/209.1; 528/176, 190, 193, 194, 271, 528/272; 422/129, 131, 261
See application file for complete search history.

(56) References Cited

U.S. PATENT DOCUMENTS

| 5,430,184 | A |   | 7/1995 | Tateno et al. |        |
|-----------|---|---|--------|---------------|--------|
| 5,530,086 | A | * | 6/1996 | Fuji et al.   | 528/193 |
| 5,629,456 | A |   | 5/1997 | Yamada et al. |        |
| 6,066,711 | A | * | 5/2000 | Hanazawa et al. | 528/176 |

FOREIGN PATENT DOCUMENTS

| JP | 03073902 | * | 3/1991 |
|----|----------|---|--------|
| JP | 6-184041 | A | 7/1994 |
| JP | 7-165657 | A | 6/1995 |
| JP | 7-507041 | A | 8/1995 |
| JP | 10-17517 | A | 1/1998 |
| JP | 2843214 | B2 | 10/1998 |
| JP | 2843215 | B2 | 10/1998 |
| JP | 11-60706 | A | 3/1999 |
| JP | 2000-319366 | A | 11/2000 |
| JP | 3331121 | B2 | 7/2002 |
| WO | WO-93/06076 | A1 | 4/1993 |

* cited by examiner

*Primary Examiner*—Terressa M Boykin
(74) *Attorney, Agent, or Firm*—Connolly Bove Lodge & Hutz LLP (57) ABSTRACT

The aim of the invention is to stably provide a polyester polymer which has excellent transparency, mechanical and electric characteristics, and extremely low optical anisotropy and excellent moldability and size stability for engineering plastics, particularly suitable for optical materials. The above-mentioned problem can be achieved by a polyester polymer, obtainable from a dicarboxylic acid compound and a dihydroxy compound, wherein the dicarboxylic acid compound comprises an alicyclic dicarboxylic acid and/or its ester-forming derivative, the dihydroxy compound comprises a compound of the general formula (1):

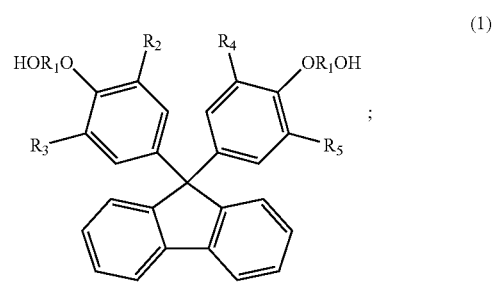

and
a content of a diethylene glycol in the polyester polymer is 6 mol % or lower.

11 Claims, 2 Drawing Sheets

POLYESTER POLYMER, ITS MOLDINGS, AND PRODUCTION METHOD OF THE POLYESTER POLYMER

This application is a National Stage of PCT/JP2004/002420 filed Feb. 27, 2004 which in turn claims priority from Japanese Application 2003-55250, filed Mar. 3, 2003.

TECHNICAL FIELD

The invention relates to a polyester polymer, its moldings, and a production method of the polyester polymer. More particularly, the invention relates to a polyester polymer and moldings thereof, which polymer has excellent transparency and heat resistance, extremely low optical anisotropy, a high refractive index, excellent moldability, small birefringence, good productivity, and suitable for not only engineering plastics but also, particularly, materials for optical instruments, and a production method of the polyester polymer.

BACKGROUND ART

Conventionally, resins excellent in transparency and mechanical characteristics have been used widely as optical materials for engineering plastics. For example, poly(methyl methacrylate) (hereinafter referred to as PMMA), polycarbonate (hereinafter referred to as PC), and amorphous polyolefin (hereinafter referred to as AOP) are used as optical materials for compact discs, laser discs, projection lenses, f-θ lenses, photographic system lenses, finder lenses, pick-up lenses, digital camera lenses, micro lens arrays, etc., and also as transparent parts and reflection materials of automobiles. PMMA has the advantage of good transparency and small optical anisotropy and is therefore used popularly, however is disadvantageous in that it is highly hydroscopic and is often deformed and inferior in the shape stability after molding.

On the other hand, PC has the advantage of high heat resistance and good transparency, however is disadvantageous in that its fluidity is low and the birefringence of its moldings is often large and accordingly, it cannot be said that PC is sufficiently satisfactory for use as optical materials. APO has the advantage of good heat resistance and transparency, however is disadvantageous in that its fluidity is low and it is colored easily at the time of molding. Further, in the case of sticking a vapor deposition film or a hard coating film, unless being subjected to pretreatment such as plasma treatment, APO cannot be provided with sufficient adhesion strength and therefore, it cannot be said that APO is sufficiently satisfactory for use as optical materials.

Further, in recent years, optical disks and digital video disks for recording and regenerating information of sound, images, letters and the like using laser beam have been developed and substrate materials having further higher optical characteristics have been desired. Miniaturization of photographic system lenses of digital cameras and compact cameras to be used for mobile phones has been advanced and also miniaturization and high precision and fineness of image recognition apparatus such as CCD and CMOS have been tried advantageously, resin materials with lower optical anisotropy have been desired.

As polyester polymers and polyester copolymers for the optical materials, polymers of aromatic dicarboxylic acids and 9,9-bis[4-(2-hydroxyethoxy)phenyl]fluorenes are proposed (e.g. Japanese Patent No.2843215 and No.2843214). Also, polymers of alicyclic dicarboxylic acids and 9,9-bis[4-(2-hydroxyethoxy)phenyl]fluorenes are proposed (e.g. Japanese Patent No.3331121 and Japanese Publicated Application H11-60706 and 2000-319366). Since these polyester copolymers have high refractive index, small birefringence and excellent heat resistance and transparency, they are useful for optical materials, but in the case of industrial production, the physical properties such as the heat resistance are sometimes fluctuated in a wide dispersion and therefore, there is a problem that the quality could not be stabilized.

As a production method of an alicyclic dicarboxylic acid to be used as a raw material, is known a method involving forming an alkali metal salt of a high purity terephthalic acid in the case, for example, of 1,4-cyclohexanedicarboxylic acid, hydrogenating the salt, and neutralizing the obtained product with an acid. As the acid to be employed for the neutralization, sulfuric acid and hydrochloric acid (e.g. Japanese Publicated Application H07-507041) are exemplified. As a production method of 1,4-cyclohexanedicarboxylic acid without using sulfuric acid or hydrochloric acid, a method involving carrying out hydrogenation in the presence of a catalyst and removing impurities by bringing the produced compound into contact with steam (e.g. Japanese Publicated Application H06-184041) is known.

As a production method of, for example, 9,9-bis[4-(2-hydroxyethoxy)phenyl]fluorene as a dihydroxy compound to be used as a raw material for polyester polymers is reported a method of synthesizing it from fluorene with bisphenoxyethanol using thioacetic acid, β-mercaptopropionic acid, or sulfuric acid as an assisting catalyst or a catalyst (e.g. Japanese Publicated Application H07-165657 and H10-17517).

However, in the case of conventional polyester polymers, depending on the situation, problems of extreme slowing down of the reaction speed during the production; deterioration of heat resistance; and coloration of resin, e.g. yellowing, are sometimes observed.

SUMMARY OF THE INVENTION

In view of the above-mentioned defective points of conventional techniques, the inventors have made various investigations and have found a polyester polymer with physical properties scarce dispersion, such as high heat resistance, and its production method and accordingly have accomplished the present invention and consequently, the aim of the invention is to stably provide a polyester polymer which has excellent transparency, mechanical and electric characteristics, and extremely low optical anisotropy and excellent moldability and size stability for engineering plastics, particularly suitable for optical materials. Further, another aim of the invention is to provide a polyester polymer whose industrial production is easy and economical, its moldings, and a production method of the polymer.

The above-mentioned aim can be achieved by a polyester polymer as shown below, its moldings, and a production method of the polyester polymer. That is, the invention provides a polyester polymer from a dicarboxylic acid or its ester-forming derivative and a dihydroxy compound, wherein the dicarboxylic acid comprises an alicyclic dicarboxylic acid and/or its ester-forming derivative, the dihydroxy compound comprises a compound of the general formula (1):

(1)

wherein $R_1$ represents an alkylene group having 2 to 4 carbon atoms; $R_2$, $R_3$, $R_4$, and $R_5$ are the same or different and each represents a hydrogen atom, or an alkyl, an aryl or an aralkyl group having 1 to 4 carbon atoms; and a content of a diethylene glycol (DEG) in the polyester polymer is 6 mol % or lower.

A polyester polymer from a dicarboxylic acid or its ester-forming derivative and a dihydroxy compound, wherein the dihydroxy compound comprises a compound of the general formula (1):

(1)

wherein $R_1$ represents an alkylene group having 2 to 4 carbon atoms; $R_2$, $R_3$, $R_4$, and $R_5$ are the same or different and each represents a hydrogen atom, or an alkyl, an aryl or an aralkyl group having 1 to 4 carbon atoms;

the dicarboxylic acid comprises an alicyclic dicarboxylic acid and an aromatic dicarboxylic acid or their ester-forming derivative, a content of a diethylene glycol in the polyester polymer is 6 mol % or lower.

The present invention provides polyester moldings obtainable by molding these polyester polymers into disk substrates, lenses, sheets, films, tubes, or fiber.

The polyester polymer is produced by the following method: wherein the polyester polymer obtainable from a dicarboxylic acid compound and a dihydroxy compound, the dicarboxylic acid compound comprises a dicarboxylic acid or its ester-forming derivative, wherein the method comprises:

the first step of transesterification or direct esterification of the dicarboxylic acid compound and the dihydroxy compound, the sulfur content in the dicarboxylic acid compound as raw material being 50 ppm or less, the dicarboxylic acid compound comprising an alicyclic dicarboxylic, the sulfur content in the dihydroxy compound being 20 ppm or less, the dihydroxy compound comprising a compound of the general formula (1); and the second step of condensation polymerization under a reduced pressure.

DETAILED DESCRIPTION OF THE INVENTION

Figure 1:
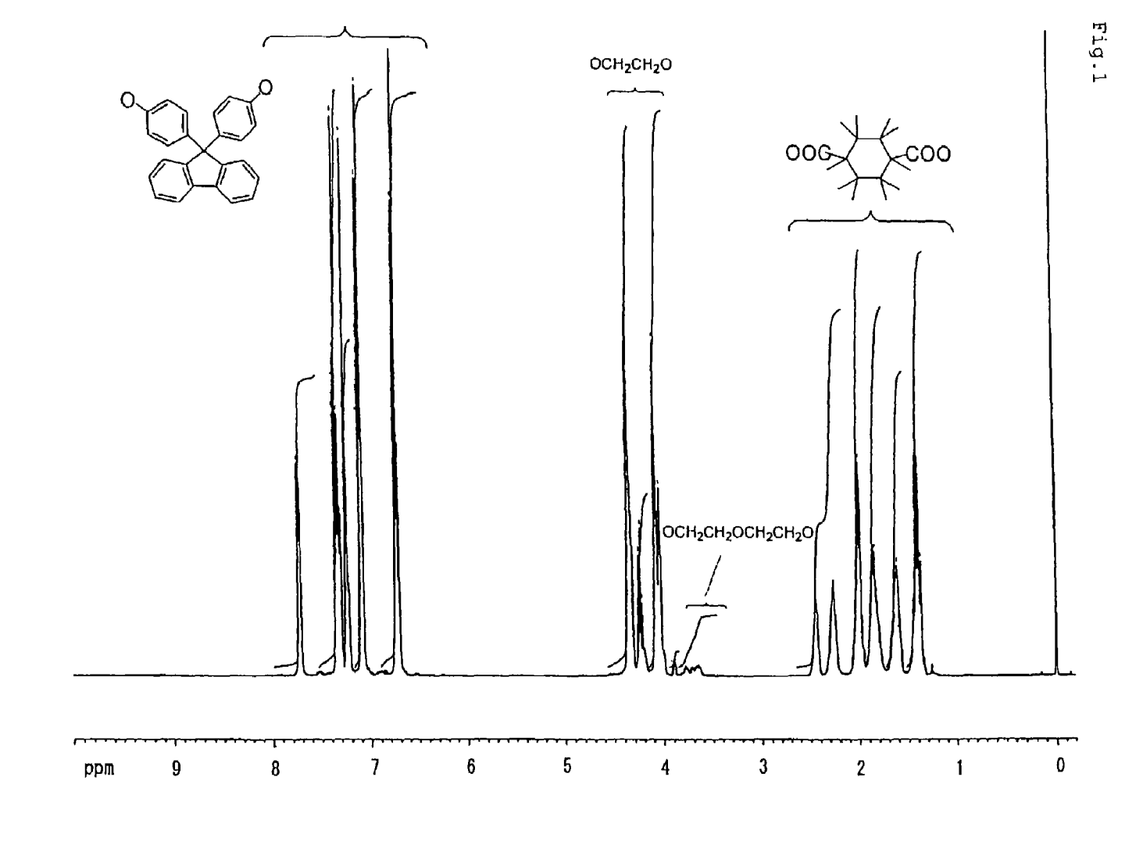
FIG. 1 is NMR spectrum of the polyester polymer of Example 1.
Figure 2:
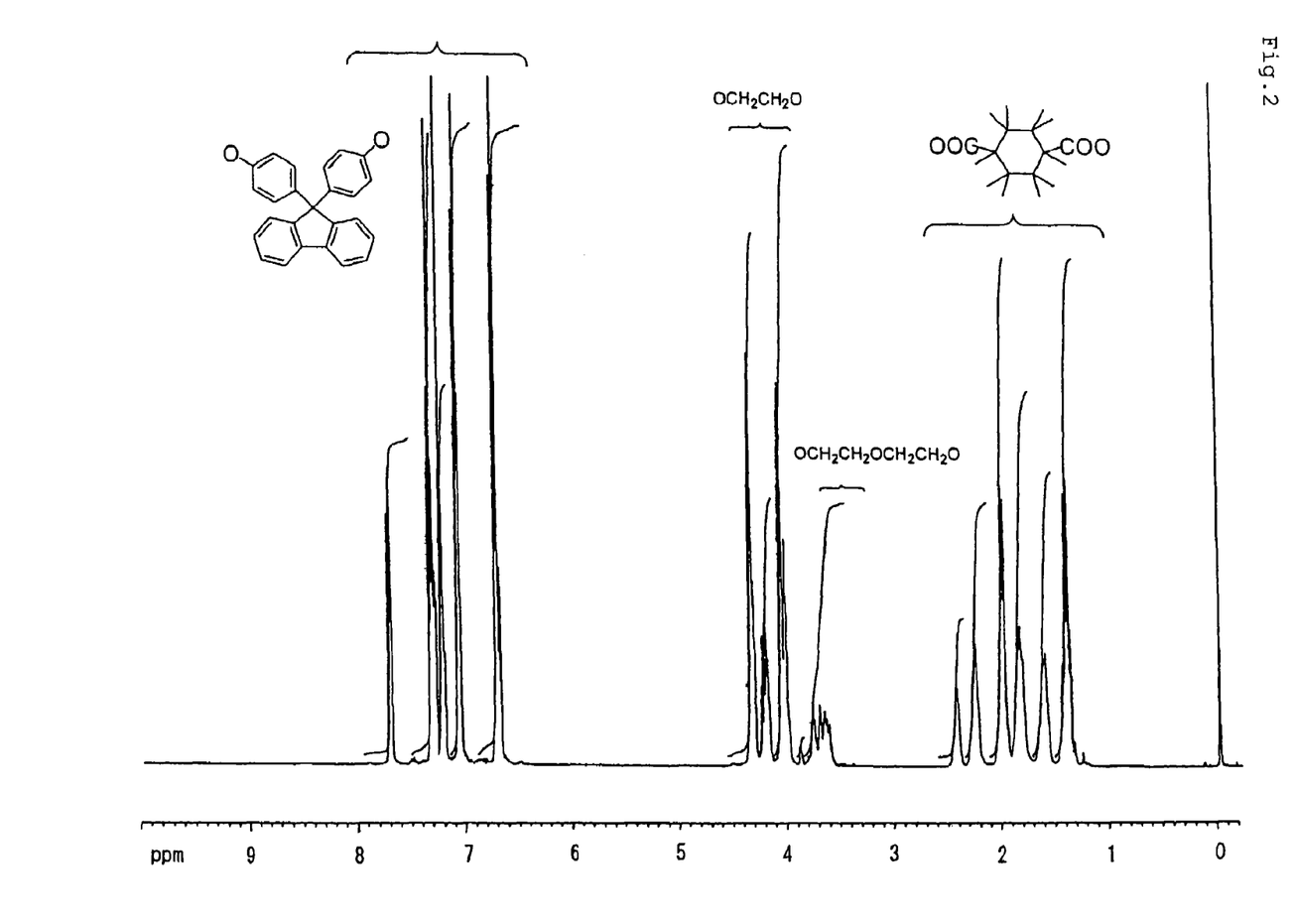
FIG. 2 is NMR spectrum of the polyester polymer of Comparative Example 2.

Hereinafter, the invention will be described more in detail with reference to the embodiments.

A polyester polymer of the invention is a polyester polymer obtainable from a dicarboxylic acid or its ester-forming derivative and a dihydroxy compound, wherein the dicarboxylic acid comprises an alicyclic dicarboxylic acid and/or its ester-forming derivative, the dihydroxy compound comprises a compound of the general formula (1):

(1)

wherein $R_1$ represents an alkylene group having 2 to 4 carbon atoms; $R_2$, $R_3$, $R_4$, and $R_5$ are the same or different and each represents a hydrogen atom, or an alkyl, an aryl or an aralkyl group having 1 to 4 carbon atoms; and a content of a diethylene glycol in the polyester polymer is 6 mol % or lower.

If the content of diethylene glycol in the polymer exceeds 6 mol %, the glass transition temperature as one index of heat resistance, is decreased; the refractive index is decreased largely; and the polymer characteristics are considerably changed, resulting in impossibility of using the polyester polymer as an optical resin. Also, it becomes difficult to industrially and economically provide the polymer with stably quality.

The content of the diethylene glycol is more preferably 4 mol % or lower and even more preferably 3 mol % or lower.

The polyester polymer of the invention is preferable to have a glass transition temperature (Tg) of 80° C. to 150° C., more preferably 100° C. to 150° C., in terms of fluidity of the melt and heat resistance of the moldings.

If a dihydroxy compound of the formula (1) and, an alicyclic dicarboxylic acid or an aromatic dicarboxylic acid are used as copolymer components in obtaining the polyester polymer, the optical anisotropy can be lowered without deterioration of formability of a polyethylene terephthalate resin.

To adjust the content of diethylene glycol in the polyester polymer to be 6 mol %, there available are methods of changing reaction conditions. The most effective method is suppressing the sulfur content in a dicarboxylic acid and a dihydroxy compound, which are raw materials of the polyester polymer. In these raw materials, sulfur-containing compounds used at the time of producing the dicarboxylic acid and dihydroxy compound remain. If this sulfur content is increased, the content of diethylene glycol in the polyester polymer is increased and if it exceeds 6 mol %, the effects of the invention cannot be achieved.

If the sulfur content is extremely high, that is if the sulfur content exceeds 100 ppm, promotion of the polymerization reaction becomes considerably slow down to result in reaction failure and impossibility of obtaining a polymer with a desired polymerization degree. Further, since the polymerization reaction is carried-out at a temperature as high as 270° C., a reaction vessel made of a stainless steel is sometimes corroded.

Accordingly, the sulfur content in the polyester polymer is preferably 70 ppm or less.

The sulfur-containing compound contained in the dicarboxylic acid component is mainly detected as sulfate ion because sulfuric acid is used as a neutralization agent in the case of 1,4-cyclohexane-dicarboxylic acid. The sulfur content in the dicarboxylic acid compound can quantitatively be determined by ion chromatography.

On the other hand, no sulfate ion is detected from compounds included in the above-mentioned polyester having the general formula (1). From a viewpoint of the production method, contamination with components such as thioacetic acid and β-mercaptopropionic acid is supposedly possible. To quantitatively determine the sulfur component, a microcoulometric titration oxidation method as well as ion chromatography can be employed for the quantitative determination. This method is a method of quantitatively determining the sulfur content by burning a sample, absorbing the sulfur dioxide produced by the combustion in an electrolytic solution, carrying out coulometric titration, and quantitatively determining the sulfur content from the consumed quantity of the electricity. The precision can be heightened by correction with a recovery coefficient calculated previously by using standardized solutions.

The decrease of the optical anisotropy is supposedly attributed to the structure in which a fluorene group is arranged in a perpendicular face relative to the main chain direction having two phenol groups.

The polyester polymer of the invention contains an aromatic dicarboxylic acid or its ester-forming derivative. Generally, it is well known that if an aromatic dicarboxylic acid (or its ester-forming derivative) such as terephthalic acid or isophthalic acid is introduced in the main chain direction, it improves the heat resistance, however the optical anisotropy is increased. Therefore, it is made possible to lower the optical anisotropy if the aromatic dicarboxylic acid component is deceased and replaced with an aliphatic dicarboxylic acid or alicyclic dicarboxylic acid. The degree of the optical anisotropy can be known by measuring the birefringence of a molding obtained by molding a polymer material. The birefringence of the moldings of the material of the invention is almost zero.

The degree of the optical anisotropy can be known by measuring the birefringence of a molding obtained by molding a polymer material. The birefringence of the moldings of the material of the invention is almost zero. It is a very important condition to use the material for an optical disc substrate, particularly an optomagnetic disc, which is a high density recording medium and it makes C/N ratio (C represents a carrier: recording signal, and N represents noise) high after the material is formed in a recording medium.

Further, a digital camera is desired to be compact, lightweight, and high precision. Miniaturization of CCD and CMOS, which carry out image processing of a digital camera, has been advanced and therefore, it is required for lens groups for focusing images on CCD and CMOS to have small birefringence so as to obtain high precision images. The polyester polymer of the invention can exhibit excellent capabilities as such an optical lens material.

Examples to be used as an alicyclic dicarboxylic acid for the polyester polymer of the invention include mono-alicyclic dicarboxylic acids such as cyclohexane-dicarboxylic acids having the following general formula (2) and poly-alicyclic dicarboxylic acids such as decalin-dicarboxylic acids having the following general formulas (3) and (4); norbornane-dicarboxylic acids having the following general formulas (5) and (6); adamantane-dicarboxylic acids having the following general formulas (7) and (8); and tricyclodecene-dicarboxylic acids having the following general formulas (9), (10), and (11):

(2)

wherein $R_6$ represents a hydrogen atom, or an alkyl, an aryl or an aralkyl group having 1 to 7 carbon atoms and may be the same or different; and the reference character a represents a natural number of 1 to 10;

(3)

wherein $R_7$ and $R_8$ independently represent a hydrogen atom, or an alkyl, an aryl or an aralkyl group having 1 to 7 carbon atoms and may be the same or different; and the reference characters b and c independently represent a natural number of 1 to 7;

(4)

wherein $R_9$ and $R_{10}$ independently represent a hydrogen atom, or an alkyl, an aryl or an aralkyl group having 1 to 7 carbon atoms and may be the same or different; and the reference characters d and e independently represent a natural number of 1 to 7;

(5)

wherein $R_{11}$ and $R_{12}$ independently represent a hydrogen atom, or an alkyl, an aryl or an aralkyl group having 1 to 7 carbon atoms and may be the same or different; and the reference characters f and g independently represent a natural number of 1 to 7;

(6)

wherein $R_{13}$ and $R_{14}$ independently represent a hydrogen atom, or an alkyl, an aryl and an aralkyl group having 1 to 7 carbon atoms and may be the same or different; and the reference characters h and i independently represent a natural number of 1 to 7;

(7)

wherein $R_{15}$, $R_{16}$, and $R_{17}$ independently represent a hydrogen atom, or an alkyl, an aryl, or an aralkyl group having 1 to 7 carbon atoms and may be the same or different; the reference characters j and k independently represent a natural number of 1 to 8; and the reference character l represents a natural number of 1 to 9;

(8)

wherein $R_{18}$, $R_{19}$, and $R_{20}$ independently represent a hydrogen atom, or an alkyl, an aryl, or an aralkyl group having 1 to 7 carbon atoms and may be the same or different; the reference character m represents a natural number of 1 to 7; and the reference characters n and o independently represent a natural number of 1 to 9;

(9)

wherein $R_{21}$ and $R_{22}$ independently represent a hydrogen atom, or an alkyl, an aryl, or an aralkyl group having 1 to 7 carbon atoms and may be the same or different; and the reference characters p and q independently represent a natural number of 1 to 7;

(10)

wherein $R_{23}$ and $R_{24}$ independently represent a hydrogen atom, or an alkyl, an aryl, or an aralkyl group having 1 to 7 carbon atoms and may be the same or different; the reference character r represents a natural number of 1 to 6 and the reference character s represents a natural number of 1 to 7; and (11)

wherein $R_{25}$ and $R_{26}$ independently represent a hydrogen atom, or an alkyl, an aryl, or an aralkyl group having 1 to 7 carbon atoms and may be the same or different; the reference character t represents a natural number of 1 to 8 and the reference character u represents a natural number of 1 to 6.

The ester-forming derivatives of these alicyclic dicarboxylic acids include dicarboxylic acid-forming derivatives generally used for polyesters and examples are alkyl esters such as dimethyl ester and diethyl ester.

These alicyclic dicarboxylic acid and its ester-forming derivatives may be used alone or if necessary, two or more of them may be used in combination.

Among these alicyclic dicarboxylic acids, 1,4-cyclohexanedicarboxylic acid and 2,6-decalindicarboxylic acid are preferable in terms of the easiness of synthesis, moldability, and optical characteristics, however it is not necessarily limited to these exemplified acids.

The alicyclic dicarboxylic acid and its ester-forming derivative to be used in the invention may be added in any desired content falling within a range from 1 to 100 mol % in 100 mol % of the entire dicarboxylic acid components and in the case of using them together with an aliphatic dicarboxylic acid as another dicarboxylic acid and in the case of using them together with a polycyclic aromatic dicarboxylic acid or biphenyldicarboxylic acid, the content is preferably 50 mol % or lower for each so as to increase the heat resistance and lower the birefringence, respectively.

A dicarboxylic acid to be used as another component in the invention may include aliphatic dicarboxylic acids such as malonic acid, succinic acid, glutaric acid, adipic acid, pimellic acid, suberic acid, azelaic acid, methylmalonic acid, and ethylmalonic acid; monocyclic aromatic dicarboxylic acids such as terephthalic acid and isophthalic acid; naphthalenedicarboxylic acids such as 2,6-naphthalenedicarboxylic acid and 1,8-naphthalenedicarboxlic acid; polycyclic aromatic dicarboxylic acid such as anthracenedicarboxylic acid, and phenanthrenedicarboxylic acid; and biphenyldicarboxylic acids such as 2,2'-biphenyldicarboxylic acid.

The dihydroxy compound of the general formula (1) in the invention includes:
9,9-bis[4-(2-hydroxyethoxy)phenyl]fluorene,
9,9-bis[4-(2-hydroxyethoxy)-3-methylphenyl]fluorene, 9,9-bis[4-(2-hydroxyethoxy)-3,5-dimethylphenyl]fluorene,
9,9-bis[4-(2-hydroxyethoxy)-3-ethylphenyl]fluorene,
9,9-bis[4-(2-hydroxyethoxy)-3,5-diethylphenyl]fluorene,
9,9-bis[4-(2-hydroxyethoxy)-3-propylphenyl]fluorene,
9,9-bis[4-(2-hydroxyethoxy)-3,5-dipropylphenyl]fluorene,
9,9-bis[4-(2-hydroxyethoxy)-3-isopropylphenyl]fluorene,
9,9-bis[4-(2-hydroxyethoxy)-3,5-diisopropylphenyl]fluorene,
9,9-bis[4-(2-hydroxyethoxy)-3-n-butylphenyl]fluorene,
9,9-bis[4-(2-hydroxyethoxy)-3,5-di-n-butylphenyl]fluorene,
9,9-bis[4-(2-hydroxyethoxy)-3-isobutylphenyl]fluorene,
9,9-bis[4-(2-hydroxyethoxy)-3,5-di-isobutylphenyl]fluorene,
9,9-bis[4-(2-hydroxyethoxy)-3-(1-methylpropyl)phenyl]fluorene,
9,9-bis[4-(2-hydroxyethoxy)-3,5-bis(1-methylpropyl)phenyl]fluorene,
9,9-bis[4-(2-hydroxyethoxy)-3-phenylphenyl]fluorene,
9,9-bis[4-(2-hydroxyethoxy)-3,5-di -phenylphenyl]fluorene,
9,9-bis[4-(2-hydroxyethoxy)-3-benzylphenyl]fluorene,
9,9-bis[4-(2-hydroxyethoxy)-3,5-di-benzylphenyl]fluorene,
9,9-bis[4-(3-hydroxypropoxy)phenyl]fluorene,
9,9-bis[4-(4-hydroxybutoxy)phenyl]fluorine, and the like; and these compounds may be used either alone or in combinations of two or more of them. Among them, the most preferable one is 9,9-bis[4-(2-hydroxyethoxy)phenyl]fluorene in terms of the optical characteristics and moldability.

For example, 9,9-bis[4-(2-hydroxyethoxy)phenyl]fluorene can be produced by addition of ethylene oxide (hereinafter, referred to as EO) to 9,9-bis(4-hydroxyphenyl) fluorene. In this case, besides 2EO adduct (9,9-bis[4-(2-hydroxyethoxy)phenyl]fluorene) obtained by adding one molecule of ethylene oxide to each hydroxyl group of the phenol, impurities such as 3EO adducts and 4EO adducts may be included in some cases. To improve the heat resistance of the polyester polymer, the purity of the 2EO adduct is preferably 95% or higher and more preferably 97% or higher.

The dihydroxy compound of the general formula (1) is preferably in a content falling within a range from 10 to 95 mol % in the glycol components in the resin. If it is 95 mol % or lower, the fusion polymerization reaction tends to be promoted easily and the polymerization time is advantageously short. If it is higher than 95 mol %, polymerization can be completed within a short time by a solution polymerization method or an interfacial polymerization method. Further, it is preferable to be 10 mol % or higher since the glass transition temperature of the resin is high.

As a dihydroxy compound to be used in the invention other than those of the general formula (1), those which are generally used for plastics can be exemplified. Examples are aliphatic glycols such as ethylene glycol, 1,3-propanediol, 1,2-propanediol, 1,4-butanediol, 1,2-butanediol, 1,3-butanediol, 1,5-pentanediol, 1,4-pentanediol, and 1,3-pentanediol; alicyclic glycols such as cyclohexanedimethanol and cyclopentanedimethanol; and aromatic diols such as 1,4-benzenedimethanol and 1,3-benzenedimethanol, and ethylene glycol and 1,4-butanediol are particularly preferable and ethylene glycol is more preferable in terms of heat resistance. These compounds may be used either alone or in combinations of two or more of them.

Further, if necessary, dihydroxy compounds having aromatic rings in the main chains and side chains, such as 1,1-bis[4-(2-hydroxyethoxy)phenyl]-1-phenylethane, and other dihydroxy compounds may be used in combination in a content limited up to 10 mol % of all diol components.

Next, a production method of the polyester polymer of the invention will be described.

The process is divided into a first step of obtaining an ester compound by reaction of a dicarboxylic acid and a dihydroxy compound and a second step of condensation polymerization of the obtained ester compound.

The esterification reaction may include two: <1> direct esterification of causing a reaction of a dicarboxylic acid and a dihydroxy compound and <2> transesterification reaction of causing a reaction of a dicarboxylic acid ester and a dihydroxy compound, and both methods can be employed for the invention.

What is important is to control the sulfur content of raw materials. To say more practically, it is required to control the sulfur content to be 50 ppm or less in the dicarboxylic acid compound in the raw materials and 20 ppm or less in the dihydroxy compound. The sulfur content is preferably 40 ppm or less in the dicarboxylic acid compound and 15 ppm or less in the dihydroxy compound.

If the sulfur content exceeds 50 ppm in the dicarboxylic acid or 20 ppm in the dihydroxy compound, a side reaction tends to be caused easily. Owing to the effect of diethylene glycol produced in a large quantity by the side reaction, the quality of the polyester polymer is deteriorated.

Sulfur in the dicarboxylic acid and the dihydroxy compound is derived from the residue of a sulfur-containing compound used in the respective production processes. At the time of producing these compounds, thioacetic acid, β-mercaptopropionic acid, and sulfuric acid are used. Impurities are removed by refining steps of distillation, adsorption, and filtration, however it is important to obtain a dicarboxylic acid compound and a dihydroxy compound with a specified value of sulfur content by strictly carrying out refining in order to obtain a polyester polymer with excellent physical properties.

The reaction conditions of the above-mentioned first step and second step may desirably be set in accordance with the selection of practical compounds to be used. Generally, in the case of carrying out transesterification reaction in the first step, the reaction is carried out in an open system, and in the case of carrying out a direct esterification reaction, the reaction may be carried out in an open system or in a pressurized system. In the second step, a reaction is promoted by increasing the temperature and at the same time gradually decreasing the pressure and the reaction is promoted finally at about 270° C. and about 133 Pa (1 Torr) or less.

The polyester polymer of the invention may be mixed with a heat stabilizer to prevent decrease of the molecular weight and deterioration of the hue at the time of molding.

The heat stabilizer include phosphorous acid, phosphoric acid, hypophosphonic acid, phosphonic acid, and their esters, and practically, triphenyl phosphite, tris(nonylphenyl) phosphite, tris(2,4-di-tert-butylphenyl) phosphite, tridecyl phosphite, trioctyl phosphite, trioctadecyl phosphite, didecylmonophenyl phosphite, dioctylmonophenyl phosphite, diiospropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearylpentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, tetrakis (2,4-di-tert-butylphenyl) 4,4'-biphenylenediphosphinate, dimethyl benzenephosphonate, diethyl benzenephosphonate, and dipropyl benzenephosphonate. Among them are preferable trisnonylphenyl phosphite, trimethyl phosphate, tris(2,4-di-tert-butylphenyl)phosphite, bis(2,4-di-tert-butylphenyl) pentaerythritol diphosphite, dimethyl benzenephosphonate.

These heat stabilizers may be used alone or in combinations of two or more of them. The addition content of the heat stabilizers is preferably 0.0001 to 1 part by weight, more preferably 0.0005 to 0.5 part by weight, and even more preferably 0.001 to 0.2 part by weight, based on 100 parts by weight of the polyester polymer, respectively.

The polyester polymer of the invention may be mixed with a conventionally known antioxidant for oxidation prevention. The antioxidant may include pentaerythritol-tetrakis(3-mercaptopropionate), pentaerythritol-tetrakis(3-laurylthiopropionate), glycerol-3-stearylthiopropionate, triethylene glycol bis[3-(3-tert-butyl-5-methyl-4-hydroxypheny)propionate], 1,6-hexanediol-bis[3-(3,5-di-tert-butyl-4-hydroxyphenyl) pro pionate], pentaerythritol-tetrakis[3-(3,5-di-tert-butyl-4-hydroxyphen yl)propionate], octadecyl-3-(3,5-di-tert-butyl-4-hydroxyphenyl)propionate, 1,3,5-trimethyl-2,4,6-tris(3,5-di-tert-butyl-4-hydroxybenzy l)benzene, N,N-hexamethylenebis(3,5-di-tert-butyl-4-hydroxy-hydrocinna mide), 3,5-di-tert-butyl-4-hydroxybenzylphosphonate diethyl ester, tris(3,5-di-tert-butyl-4-hydroxybenzyl)isocyanurate, tetrakis(2,4-di-tert-butylphenyl) 4,4'-biphenylenediphosphinate, and 3,9-bis{1,1-dimethyl-2-[β-(3-tert-butyl-4-hydroxy-5-methylp henyl)propionyloxy]ethyl}-2,4,8,10-tetraoxaspiro(5,5)undecane, and the like.

The addition content of these antioxidants is preferably 0.0001 to 0.5 part by weight based on 100 parts by weight of the polyester polymer.

To improve the release property from a molding die at the time of melt molding, the polyester polymer of the invention may be mixed with a release agent without departing from the aims and scope of the invention. The release agent may include higher fatty acid esters of mono- or polyhydric alcohols, higher fatty acids, paraffin waxes, bees waxes, olefin waxes, olefin type waxes containing carboxyl and/or carbonic acid anhydride group, silicone oils, and organopolysiloxanes, and the like. The addition content of the release agent is preferably 0.01 to 5 parts by weight based on 100 parts by weight of the polyester polymer.

As the higher fatty acid esters, partial esters or entire esters of the mono- or polyhydric alcohols having 1 to 20 carbon atoms and saturated fatty acids having 10 to 30 carbon atoms are preferable. Examples of partial esters or entire esters of the mono- or polyhydric alcohols and the saturated fatty acids are stearic acid monoglyceride, stearic acid diglyceride, stearic acid triglyceride, stearic acid monosorbitate, stearyl stearate, behenic acid monoglyceride, behenyl behenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitane monostearate, 2-ethylhexyl stearate, and the like.

Among them, stearic acid monoglyceride, stearic acid triglyceride, pentaerythritol tetrastearate, and behenyl behenate can be used preferably.

As the higher fatty acids of the invention, saturated fatty acids having 10 to 30 carbon atoms are preferable. Examples of the higher fatty acids are myristic acid, lauric acid, palmitic acid, stearic acid, and behenic acid.

These release agents may be used alone or in combination of two or more of them.

The polyester polymer of the invention may be mixed with a photostabilizer without departing from the aims and scope of the invention.

The photostabilizer includes, for example, 2-(2'-hydroxy-5'-tert-octylphenyl)benzotriazole, 2-(3-tert-butyl-5-methyl-2-hydroxyphenyl)-5-chlorobenzotriazole, 2-(5-methyl-2-hydroxyphenyl)benzotriazole, 2-[2-hydroxy-3,5-bis(α,α-dimethylbenzyl)phenyl]-2H-benzotriazole, 2,2'-methylenebis(4-cumyl-6-benzotriazolephenyl), 2,2'-p-phenylenebis(1,3-benzoxazin-4-one), and the like. The addition content of the photostabilizer is preferably 0.01 to 2 parts by weight based on 100 parts by weight of the polyester polymer.

These photostabilizers may be used alone or in combination of two or more of them.

In the case of being molded in lenses, the polyester polymer of the invention may be mixed with a bluing agent so as to cancel the yellowish tone of the lenses attributed to the polyester polymer or an ultraviolet absorbent. Any bluing agent usable for polyester resins and polycarbonates can be used without any particular obstacles as the bluing agent.

Generally, anthraquinone type dyes are easily available and therefore preferable. As a practical bluing agent, conventional name, Solvent Violet 13 [CA. No (color index NO.) 60725], conventional name, Solvent Violet 31 [CA. No. 68210], conventional name, Solvent Violet 33 [CA. No. 60725], conventional name, Solvent Blue 94 [CA. No.61500], conventional name, Solvent Violet 36 [CA. No. 68210], conventional name, Solvent Blue 97, and conventional name, and Solvent Blue 45 [CA. No. 61110] can be exemplified as representative examples. In general, these bluing agent is admixed in a content of $0.1 \times 10^{-4}$ to $2 \times 10^{-4}$ part by weight based on 100 parts by weight of the polyester polymer.

When a heat stabilizer, an antioxidant, an antistatic agent, a release agent, a photostabilizer, a ultraviolet absorbent, a dye, and a pigment are added to the polyester polymer of the invention, in order to obtain increased compatibility and stabilized physical properties, there are a method of sticking the additives to chips and a method of kneading them using a monoaxial extruder or a biaxial extruder in the melt extrusion and making them into chips. To further improve the compatibility and to get stabilized release property and respective physical properties, use of the monoaxial extruder and biaxial extruder is preferable.

The method using the monoaxial extruder or biaxial extruder does not require a solvent, and which causes a slight load on environments, and can be employed preferably in terms of the productivity. The melting and kneading temperature of the extruder is 200 to 350° C., preferably 230 to 300° C. If it is lower than 200° C., the melt viscosity of the resin is high and the load on the extruder becomes heavy, and therefore, the productivity is lowered. If it is higher than 350° C., the resin tends to be easily deteriorated and becomes yellowish, and the strength of the resin is lowered because of decreasing the molecular weight of resin.

In the case of using the extruder, to prevent burning of the resin and contamination of the resin with foreign substances, it is preferable to install a filter. Although the size of the filter for removing the foreign substances depends on the optical precision required, it is preferably suitable to make a filter have a capability of cutting 100 μm or smaller foreign substances. Particularly, in the case contamination with foreign substances should be avoided, it is further preferable to have the capability of cutting 40 μm or smaller and further 10 μm or smaller foreign substances.

The resin extruded out of the extruder is desirable to be subjected treatment in a clean room to prevent contamination of the foreign substances.

Further, at the time of cooling the extruded resin and forming them into chips, it is preferable to employ a cooling method, e.g. air cooling or water cooling. As the air to be used at the time of air cooling, it is desirable to use the air from which foreign substances in the air are previously removed by a HEPA filter, and which can prevent re-adhesion of the foreign substances. In the case of using water cooling, it is desirable to use water from which metal components are removed by ion exchange resins and further foreign substances in water are removed by a filter. The size of the filter is various, but use of a filter with a size of 10 to 0.45 μm is preferable.

With respect to the polymerization degree of the polyester polymer, the polyester polymer is preferably a polyester polymer (a first component) having an intrinsic viscosity (measured in a mixed solution of phenol 60% by weight and 1,1,2,2-tetrachloroethane 40% by weight at 20° C.) in a range from 0.3 to 0.8. Those which have considerably low intrinsic viscosity are weak in the mechanical strength in the case of being molding into lenses. If the intrinsic viscosity is increased, the fluidity is lowered in molding to result in the tendency of deteriorating the cycle properties and increasing the birefringence of molded products. Accordingly, as the polyester polymers, those having the intrinsic viscosity as the polymerization degree falling within a range from 0.3 to 0.8, more preferably 0.35 to 0.7, are used.

In the case of using the polyester polymer of the invention for an optical material, dust has to be carefully prevented from contamination in the loading step of a raw material as well as a polymerization step, a step of pelletizing a polymer, and a step of injection molding and molding the polymer in to a sheet-like or film-like shape. In such a case, generally in the case of a compact disc (hereinafter, referred to as CD), class 1000 or less is preferable and in the case of further advanced information recording, class 100 or less is preferable.

Since the polyester polymer of the invention is amorphous, it has excellent transparency and also has excellent melt viscosity characteristics and it is thus excellent in moldability and accordingly, a remaining stress strain or molecular orientation hardly takes place at the time of molding and even if it remains or occurs, the optical anisotropy is extremely small. Consequently, the polyester polymer is a resin remarkably useful and suitable for transparent materials and optical materials.

The polyester moldings of the invention can be obtained from the above-mentioned polyester polymer by conventionally known molding methods, e.g. an injection molding method, an injection compression molding method, a transfer molding method, a blow molding method, an extrusion molding method, a pressurizing molding method, and a casting molding method. At the time of molding, any proper molding method may be selected from these molding methods and for example, for forming the polymer into optical disc substrates, lenses, general molded products, and the like, the injection molding method and the injection compression molding method are preferred. For forming the polymer into films, sheets, optical fibers, fibers and the like, the extraction molding method is preferred. Further, for forming the polymer into bottles, bags, and the like, the blow molding method is preferred, and for shaping, the pressurizing molding and the transfer molding are preferred. Among them, in the case of obtaining moldings, that is moldings for optics, required to have transparency, low optical an isotropy, and heat resistance, which are excellent characteristics of the polyester polymer of the invention, the injection molding method, the injection compression molding method, and the extrusion molding method are preferable.

To mold an optical disc substrate, which is one example of the moldings for optics, an injection compression molding apparatus is very proper and adequate selection of the molding conditions such as the resin temperature, the molding die temperature, and the holding pressure makes it possible to give excellent disc substrates with small birefringence and uniform birefringence, thickness and transfer property in the radius direction, and free from warping. Such molding conditions differ depending on the composition and polymerization degree and cannot be generalized, however the molding die temperature is preferably the glass transition temperature of the polymer, which may fall between 80° C. or higher and 150° C. or lower. Also, the resin temperature preferably falls between 230° C. or higher and 320° C. or lower. If it is lower than 230° C., the fluidity and the transfer property of the resin are lowered and the stress strain remains and the birefringence is increased at the time of molding. If it exceeds 320° C., thermal decomposition of the resin tends to occur easily and it decreases the strength of the molding products and causes coloration and further it may possibly result in pollution of the mirror face of molding dies and stumpers and deterioration of the release property.

To produce plastic lenses, which is one example of moldings for optics, the injection molding, the injection compression molding, the compression molding, the vacuum molding, and other methods may be employed and an injection molding apparatus and an injection compression molding apparatus are very suitable in terms of mass production and adequate selection of the molding conditions such as the resin temperature, the molding die temperature, and the holding pressure makes it possible to give plastic lenses with small optical strains. Such molding conditions differ depending on the composition and polymerization degree and cannot be generalized, however the molding temperature is preferably 230° C. or higher and 320° C. or lower: the molding die temperature is preferably a glass transition temperature or a temperature lower than the glass transition temperature by 5° C. to 20° C., that is 60° C. or higher and 150° C. or lower. The precision of the molded plastic lens is defined by the size precision and surface characteristics and if the precision is low, the optical strain becomes significant, however use of the resin of the invention makes it easy to give plastic lenses with small optical strains in the above-mentioned conditions.

EXAMPLES

Hereinafter, the invention will be described more in details by means of Examples. The glass transition temperature and the birefringence of polymers in Examples were measured by the following methods.

1. Glass Transition Temperature

The glass transition temperature was measured by heating a sample about 10 mg at heating rate of 10° C./min using a differential scanning calorimeter (DSC-110, manufactured by Seiko Instruments Inc.). The glass transition temperature Tg was calculated according to JIS K 7121 (1987).

2. Refractive Index

The refractive index nd was measured at the D line using an interference filter of 589 nm wavelength using an Abbe's refractometer DR-M2 manufactured by Atago Co., Ltd. A sample for the measurement was prepared by press-molding each resin at 160 to 240° C. for producing a film with a thickness of 80 to 150 μm and cutting the film in strips of about 8×20 mm for obtaining specimens for measurement. As an interfacial liquid, 1-bromonaphthalene was used and measurement was carried out at 20° C.

3. NMR

Each sample was dissolved in chloroform deuteride and mixed with tetramethylsilane as a standard product and subjected to the proton NMR spectrometry using FT-NMR apparatus of DPX-400 (400 MHZ) manufactured by Bruker Co., Ltd.

4. Quantitative Determination of Diethylene Glycol

Sample Preparation

At first, 1-propanol 50 ml was put in a ground stopper flask of 200 ml capacity; potassium hydroxide 2.81 g and precisely weighed resin chips 2 g were added; a ball-containing cooling tube cooled with water was attached to the flask; and under the stirring condition, the mixture was refluxed with heating for 2 hours. After cooling, water 10 ml was added, terephthalic acid 7 g was added and the resulting mixture was refluxed with heating for 1 hour. As an inner standard, a 1-propanol solution 5 ml containing 1% of tetraethylene glycol dimethyl ether was added and stirred for about 5 minutes. The sample separated by filtration was subjected to quantitative determination by gas chromatography to calculate a content of diethylene glycol.

5. Quantitative Determination of Sulfur

The sulfur component was quantitatively determined by ion chromatography.

Sample Preparation

Each sample 0.1 g was put in a messflask of 20 ml capacity; the flask was filled with pure water 20 ml; extraction was carried out for 10 minutes by a ultrasonic vibrator; and then the sample was filtered with a 0.45 μm filter to obtain a sample for measurement.

An aqueous 7 mmol KOH solution was used as an effluent and AS-17 (Dionex) was used as a column to carry out quantitative determination.

With respect to the sulfur components derived from other than sulfuric acid such as thioacetic acid, β-mercaptopropionic acid and p-toluenesulfonic acid, the measurement of sulfur content was carried out according to JIS-K 2541. Sulfur quantitative determination was carried out by burning a sample by a sulfur quantitative determination apparatus, TOC-10 manufactured by Mitsubishi Chemical Corp., collecting the sulfuric acid gas generated at the time of burning, and carrying out coulometric titration.

Example 1

As raw materials, 1,4-cyclohexanedicaboxylic acid 1 mol (manufactured by Eastman Chemical Company) containing sulfuric acid-derived sulfur 33 ppm, 9,9-bis[4-(2-hydroxyethoxy)phenyl]fluorene 0.8 mol (BPEF, manufactured by Osaka Gas Chemicals Co., Ltd.) containing sulfuric acid-derived sulfur-7.7 ppm, and ethylene glycol 2.2 mol were loaded into a reaction vessel and while stirring, the mixture was gradually heated from a room temperature to 230° C. to carry out esterification reaction by a common method. After a prescribed content of water was discharged out of the reaction system, germanium oxide, a polymerization catalyst, 0.002 mol and trimethyl phosphate 0.0014 mol for preventing coloration were added and heating and pressure reduction were carried out gradually to increase the temperature of the vessel to 270° C. and the vacuum decrease to 133 Pa (1 Torr) or less while the generated ethylene glycol being discharged. These conditions were kept to wait increase of the viscosity and when the stirring torque reached a prescribed level (about after 4 hours), the reaction was stopped and the reaction product was extruded to water to obtain pellets.

The resin was pressed at 200° C. to obtain a film with a thickness of 100 μm. The refractive index was 1.607; the glass transition temperature was 126° C., and the content of DEG was 1.8 mol %.

Examples 2 to 7

Pellets were produced in the same manner as in Example 1, except that the raw material compositions and the sulfur contents were changed as shown in Table 1 and the pellets were similarly subjected to the evaluation. The results are shown in Table 1. All had uniform transparency and good moldability.

Comparative Example 1

As raw materials, 1,4-cyclohexanedicaboxylic acid 1 mol (manufactured by Eastman Chemical Company) containing sulfuric acid-derived sulfur 73 ppm, 9,9-bis[4-(2-hydroxyethoxy)phenyl]fluorene 0.8 mol (manufactured by Osaka Gas Chemicals Co., Ltd.) containing sulfuric acid-derived sulfur 7.7 ppm, and ethylene glycol 2.2 mol were loaded into a reaction vessel and while stirring, the mixture was gradually heated from a room temperature to 230° C. to carry out esterification reaction by a common method. After a prescribed content of water was discharged out of the reaction system, germanium oxide, a polymerization catalyst, 0.002 mol and trimethyl phosphate 0.0014 mol for preventing coloration were added and heating and pressure reduction were carried out gradually to increase the temperature of the vessel to 270° C. and the vacuum decrease to 133 Pa (1 Torr) or less while the generated ethylene glycol being discharged. These conditions were kept to wait increase of the viscosity, however the stirring torque did not reach a prescribed level and therefore, after a prescribed time (about after 4 hours), the reaction was stopped and the reaction product was extruded to water to obtain pellets.

The resin was pressed at 200° C., however it was too fragile to obtain a film. The glass transition temperature was 69° C. and the content of DEG was 23 mol %. The results are shown in Table 1. No injection molded product was obtained because of its fragility.

Comparative Example 2

As raw materials, 1,4-cyclohexanedicaboxylic acid 1 mol (manufactured by Eastman Chemical Company) containing sulfuric acid-derived sulfur 16 ppm, 9,9-bis[4-(2-hydroxyethoxy)phenyl]fluorene 0.8 mol (manufactured by Osaka Gas Chemicals Co., Ltd.) containing sulfuric acid-derived sulfur 25 ppm, and ethylene glycol 2.2 mol were loaded into a reaction vessel and while stirring, the mixture was gradually heated from a room temperature to 230° C. to carry out esterification reaction by a common method. After a prescribed content of water was discharged out of the reaction system, germanium oxide, a polymerization catalyst, 0.002 mol and trimethyl phosphate 0.0014 mol for preventing coloration were added and heating and pressure reduction were carried out gradually to increase the temperature of the vessel to 270° C. and the vacuum decrease to 133 Pa (1 Torr) or less while the generated ethylene glycol being discharged. These conditions were kept and when the stirring torque reached a prescribed level (about after 4 hours), the reaction was stopped and the reaction product was extruded to water.

The resin was pressed at 200° C. to obtain a film with a thickness of 100 μm. The refractive index was 1.605, the glass transition temperature was 112° C. and the content of DEG was 7.2 mol %. Although the moldings were moldable and the raw material composition ratios were same as those of Examples 1 to 7 and a prescribed content of 9,9-bis[4-(2-hydroxyethoxy)phenyl]fluorene remained, the refractive index and the glass transition temperature were low and the physical properties were deteriorated.

Comparative Example 3

Pellets were produced in the same manner as in Comparative Example 1, except that the raw material composition and the sulfur contents were changed as shown in Table 1 and the pellets were similarly subjected to the evaluation. The results are shown in Table 1. Physical properties were deteriorated similarly as Comparative Example 2.

Comparative Example 4

Production was carried out in the same manner as in Comparative Example 1, except that the raw material composition and the sulfur contents were changed as shown in Table 1, however the torque was not increased at all and stirring blades made of a stainless steel were corroded. A colored reaction product was obtained and no aimed polymer was obtained.

Example 8

As raw materials, 1,4-cyclohexanedicaboxylic acid dimethyl ester 1 mol (manufactured by Eastman Chemical Company) containing sulfuric acid-derived sulfur 0 ppm, 9,9-bis[4-(2-hydroxyethoxy)phenyl]fluorene 0.8 mol (manufactured by Osaka Gas Chemicals Co., Ltd.) containing sulfuric acid-derived sulfur 10 ppm, ethylene glycol 2.2 mol, and as catalysts calcium acetate 0.0008 mol and manganese acetate 0.0002 mol were loaded into a reaction vessel and while stirring, the mixture was gradually heated from a room temperature to 230° C. to carry out transesterification reaction by a common method. After a prescribed content of methanol was discharged out of the reaction system, germanium oxide, a polymerization catalyst, 0.002 mol and trimethyl phosphate 0.0014 mol for preventing coloration were added and heating and pressure reduction were carried out gradually to increase the temperature of the vessel to 270° C. and the vacuum decrease to 133 Pa (1 Torr) or less while the generated ethylene glycol being discharged. These conditions were kept to wait increase of the viscosity and when the stirring torque reached a prescribed level (about after 4 hours), the reaction was stopped and the reaction product was extruded to water to obtain pellets.

The resin was pressed at 200° C. to obtain a film with a thickness of 100 μm. The refractive index was 1.607; the glass transition temperature was 121° C., and the content of DEG was 2.5 mol %.

Examples 9 to 11

Pellets were produced in the same manner as in Example 8, except that the raw material compositions and the sulfur contents were changed as shown in Table 1 and the pellets were similarly subjected to the evaluation. The results are shown in Table 1. All had uniform transparency and good moldability.

Comparative Example 5

Pellets were produced in the same manner as in Example 10, except that the raw material composition and the sulfur contents were changed as shown in Table 1 and the pellets were similarly subjected to the evaluation. The results are shown in Table 1. The glass transition temperature was lower by 10° C. than that in Example 10 and physical properties were deteriorated.

Comparative Example 6

Pellets were produced in the same manner as in Example 8, except that the raw material composition and the sulfur contents were changed as shown in Table 1 and the pellets were similarly subjected to the evaluation. The results are shown in Table 1. The glass transition temperature was lower by 11° C. than that in Example 8 and physical properties were deteriorated.

Comparative Example 7

Pellets were produced in the same manner as in Example 9, except that the raw material composition and the sulfur contents were changed as shown in Table 1 and the pellets were similarly subjected to the evaluation. The results are shown in Table 1. The glass transition temperature was lower by 8° C. than that in Example 9 and physical properties were deteriorated.

Example 12

As raw materials, 2,6-decalindicaboxylic acid dimethyl ester 1 mol, 9,9-bis[4-(2-hydroxyethoxy)phenyl]fluorene 0.55 mol (manufactured by Osaka Gas Chemicals Co., Ltd.), ethylene glycol 2.2 mol, and as catalysts calcium acetate 0.0008 mol and manganese acetate 0.0002 mol were loaded into a reaction vessel and while stirring, the mixture was gradually heated from a room temperature to 230° C. to carry out transesterification reaction by a common method. After a prescribed content of methanol was discharged out of the reaction system, germanium oxide, a polymerization catalyst, 0.012 mol and trimethyl phosphate 0.0018 mol for preventing coloration were added and heating and pressure reduction were carried out gradually to increase the temperature of the vessel to 270° C. and the vacuum decrease to 133 Pa (1 Torr) or less while the generated ethylene glycol being discharged. These conditions were kept to wait increase of the viscosity and when the stirring torque reached a prescribed level (about after 2 hours), the reaction was stopped and the reaction product was extruded to water to obtain pellets.

The glass transition temperature was 123° C. and the content of DEG was 2.3 mol %.

Example 13

Pellets were produced in the same manner as in Example 12, except that the raw material composition was changed as shown in Table 1 and the pellets were similarly subjected to the evaluation. The results are shown in Table 1. All had uniform transparency and good moldability.

Comparative Example 8

Pellets were produced in the same manner as in Example 12, except that the raw material composition was changed as shown in Table 1 and the pellets were similarly subjected to the evaluation. The results are shown in Table 1. Although all had uniform transparency, the glass transition temperature was lower by 12° C. than that in Example 12 and physical properties were deteriorated.

Example 14

As raw materials, 1,4-cyclohexanedicaboxylic acid 0.5 mol (manufactured by Eastman Chemical Company) containing sulfuric acid-derived sulfur 33 ppm, terephthalic acid containing sulfuric acid-derived sulfur 0 ppm, 9,9-bis[4-(2-hydroxyethoxy)phenyl]fluorene 0.75 mol (BPEF, manufactured by Osaka Gas Chemicals Co., Ltd.) containing sulfuric acid-derived sulfur 7.7 ppm, and ethylene glycol 2.2 mol were loaded into a reaction vessel and while stirring, the mixture was gradually heated from a room temperature to 230° C. to carry out esterification reaction by a common method. After a prescribed content of water was discharged out of the reaction system, germanium oxide, a polymerization catalyst, 0.002 mol and trimethyl phosphate 0.0014 mol for preventing coloration were added and heating and pressure reduction were carried out gradually to increase the temperature of the vessel to 270° C. and the vacuum decrease to 133 Pa (1 Torr) or less while the generated ethylene glycol being discharged. These conditions were kept to wait increase of the viscosity and when the stirring torque reached a prescribed level (about after 4 hours), the reaction was stopped and the reaction product was extruded to water to obtain pellets.

The resin was pressed at 200° C. to obtain a film with a thickness of 100 μm. The refractive index was 1.619; the glass transition temperature was 136° C., and the content of DEG was 2.5 mol %.

Comparative Example 9

Pellets were produced in the same manner as in Example 8, except that dimethyl terephthalate was used as a dicarboxylic acid and 0 mol of 9,9-bis(4-hydroxyethoxyphenyl)fluorene was used. The glass transition temperature was as low as 75° C. and heat resistance was insufficient. When a lens was molded, it became opaque and could not be used as a lens.

TABLE 1

| | Loading (mol) | | | | | | |
|---|---|---|---|---|---|---|---|
| | Dicarboxylic acid | | | | | Dihydroxy compound | |
| | A | B | C | D | E | a | b |
| Example1 | 1 | — | — | — | — | 2.2 | 0.8 |
| Example2 | 1 | — | — | — | — | 2.2 | 0.8 |
| Example3 | 1 | — | — | — | — | 2.2 | 0.8 |
| Example4 | 1 | — | — | — | — | 2.2 | 0.8 |
| Example5 | 1 | — | — | — | — | 2.2 | 0.8 |
| Example6 | 1 | — | — | — | — | 2.2 | 0.8 |
| Example7 | 1 | — | — | — | — | 2.2 | 0.8 |
| Example8 | — | — | 1 | — | — | 2.2 | 0.8 |
| Example9 | — | — | 1 | — | — | 2.2 | 0.4 |
| Example10 | — | — | 0.9 | 0.1 | — | 2.2 | 0.7 |
| Example11 | — | — | 0.8 | 0.2 | — | 2.2 | 0.7 |
| Example12 | — | 1 | — | — | — | 2.2 | 0.55 |
| Example13 | — | 1 | — | — | — | 2.2 | 0.7 |
| Example14 | 0.5 | — | — | — | 0.5 | 2.2 | 0.75 |
| Comparative example1 | 1 | — | — | — | — | 2.2 | 0.8 |
| Comparative example2 | 1 | — | — | — | — | 2.2 | 0.8 |
| Comparative example3 | 1 | — | — | — | — | 2.2 | 0.8 |
| Comparative example4 | 1 | — | — | — | — | 2.2 | 0.8 |
| Comparative example5 | — | — | 0.9 | 0.1 | — | 2.2 | 0.7 |
| Comparative example6 | — | — | 1 | — | — | 2.2 | 0.8 |
| Comparative example7 | — | — | 1 | — | — | 2.2 | 0.4 |
| Comparative example8 | — | 1 | — | — | — | 2.2 | 0.55 |

| | Sulfur content in A ppm | Sulfur content in B ppm | Sulfur content in C ppm | Sulfur content in D ppm | Sulfur content in E ppm | Sulfur content in a ppm | Sulfur content in b ppm |
|---|---|---|---|---|---|---|---|
| Example1 | 33 | — | — | — | — | 0 | 7.7 |
| Example2 | 16 | — | — | — | — | 0 | 7.5 |
| Example3 | 0 | — | — | — | — | 0 | 9.7 |
| Example4 | 0 | — | — | — | — | 0 | 7.7 |
| Example5 | 30 | — | — | — | — | 0 | 2.3 |
| Example6 | 43 | — | — | — | — | 0 | 10 |
| Example7 | 43 | — | — | — | — | 0 | 7.7 |
| Example8 | — | — | 0 | — | — | 0 | 10 |
| Example9 | — | — | 0 | — | — | 0 | 10 |
| Example10 | — | — | 0 | 0 | — | 0 | 10 |
| Example11 | — | — | 0 | 0 | — | 0 | 10 |
| Example12 | — | 0 | — | — | — | 0 | 10 |
| Example13 | — | 0 | — | — | — | 0 | 10 |

TABLE 1-continued

| | | | | | | | |
|---|---|---|---|---|---|---|---|
| Example14 | — | — | — | — | 0 | 0 | 4 |
| Comparative example1 | 73 | — | — | — | — | 0 | 7.7 |
| Comparative example2 | 16 | — | — | — | — | 0 | 25 |
| Comparative example3 | 30 | — | — | — | — | 0 | 25 |
| Comparative example4 | 30 | — | — | — | — | 0 | 540 |
| Comparative example5 | — | — | 0 | 0 | — | 0 | 40 |
| Comparative example6 | — | — | 0 | — | — | 0 | 40 |
| Comparative example7 | — | — | 0 | — | — | 0 | 40 |
| Comparative example8 | — | 0 | — | — | — | 0 | 40 |

| | Glass transition temperature ° C. | Refractive index | b content in resin mol % | DEG content in resin mol % |
|---|---|---|---|---|
| Example1 | 126 | 1.607 | 80 | 1.8 |
| Example2 | 124 | 1.607 | 81 | 1.8 |
| Example3 | 123 | 1.607 | 81 | 3.1 |
| Example4 | 123 | 1.607 | 81 | 2.3 |
| Example5 | 125 | 1.607 | 81 | 1.3 |
| Example6 | 125 | 1.607 | 81 | 1.8 |
| Example7 | 121 | 1.607 | 80 | 1.8 |
| Example8 | 121 | 1.607 | 81 | 2.5 |
| Example9 | 88 | 1.581 | 40 | 2.3 |
| Example10 | 119 | — | 70 | 2.3 |
| Example11 | 112 | — | 70 | 1.8 |
| Example12 | 123 | — | 55 | 2.3 |
| Example13 | 133 | — | 70 | 2.6 |
| Example14 | 136 | 1.619 | 75 | 2.5 |
| Comparative example1 | 69 | — | 80 | 23 |
| Comparative example2 | 112 | 1.605 | 80 | 7.2 |
| Comparative example3 | 112 | 1.605 | 81 | 7.3 |
| Comparative example4 | 84 | — | — | — |
| Comparative example5 | 109 | — | 70 | 7.1 |
| Comparative example6 | 110 | 1.605 | 80 | 6.5 |
| Comparative example7 | 80 | 1.579 | 40 | 7.2 |
| Comparative example8 | 112 | — | 55 | 6.8 |

A 1,4-cyclohexanedicarboxylic acid
B 2,6-decalin-dicarboxylic acid dimethyl ester
C 1,4-cyclohexanedicarboxylic acid dimethyl ester
D terephthalic acid dimethyl ester
E terephthalic acid
a ethylene glycol
b 9,9-bis[4-(2-hydroxyethoxy)phenyl]fluorene

INDUSTRIAL APPLICABILITY

As described above, the polyester polymer of the invention has excellent transparency and small optical anisotropy and can provide a molding material excellent in moldability, size stability, and chemical resistance. It is found that use of monomer materials with a small sulfur content makes it possible to prevent deterioration of optical characteristics such as refractive index and heat resistance such as glass transition temperature and to stably produce materials usable for industrial uses, for example, optical materials such as plastic lenses, optical fibers, and optical discs; fiber materials; microlens arrays; films; and sheets and provide materials having constant physical properties. Also, the yield is improved and the polyester polymer has significant economical advantages.

The invention claimed is:

1. A method of producing a polyester polymer from a dicarboxylic acid compound and a dihydroxy compound, said dicarboxylic acid compound comprising dicarboxylic acid or its ester-forming derivative, wherein the method comprises: the first step of transesterification or direct esterification of the dicarboxylic acid compound and the dihydroxy compound, the sulfur content in the dicarboxylic acid compound as raw material being 50 ppm or less, the dicarboxylic acid compound comprising an alicyclic dicarboxylic acid and/or its ester-forming derivative, the sulfur content in the dihydroxy compound being 20 ppm or less, the dihydroxy compound comprising ethylene glycol and a compound of the general formula (1):

(1)

wherein $R_1$ represents an alkylene group having 2 to 4 carbon atoms; $R_2$, $R_3$, $R_4$, and $R_5$ are the same or different and each represents a hydrogen atom, an alkyl having 1 to 4 carbon atoms, an aryl or an aralkyl group;
and the second step of condensation polymerization under a reduced pressure; and wherein the polyester polymer has a content of diethylene glycol of 6 mol % or lower and a sulfur content of 70 ppm or less.

2. A method of producing a polyester polymer from a dicarboxylic acid compound and a dihydroxy compound, said dicarboxylic acid compound comprising a dicarboxylic acid or its ester-forming derivative, wherein the method comprises: the first step of transesterification or direct esterification of the dicarboxylic acid compound and the dihydroxy compound, the sulfur content in the dicarboxylic acid compound as raw material being 50 ppm or less, the dicarboxylic acid compound comprising an alicyclic dicarboxylic acid and/or its ester-forming derivative and an aromatic dicarboxylic acid and/or its ester-forming derivative, the sulfur content in the dihydroxy compound being 20 ppm or less, the dihydroxy compound comprising ethylene glycol and a compound of the general formula (1):

(1)

wherein $R_1$ represents an alkylene group having 2 to 4 carbon atoms; $R_2$, $R_3$, $R_4$, and $R_5$ are the same or different and each represents a hydrogen atom, an alkyl having 1 to 4 carbon atoms, an aryl or an aralkyl group;
and the second step of condensation polymerization under a reduced pressure; and wherein the polyester polymer has a content of diethylene glycol of 6 mol % or lower and a sulfur content of 70 ppm or less.

3. The process according to claim 1, wherein the alicyclic dicarboxylic acid is at least one compound selected from the group consisting of cyclohexane-dicarboxylic acid, decalin-dicarboxylic acid, norbomane-dicarboxylic acid, adamantane-dicarboxylic acid and tricyclodecene-dicarboxylic acid.

4. The process according to claim 1, wherein the dihydroxy compound of the general formula (1) is at least one member selected from the group consisting of 9,9-bis[4-(2-hydroxyethoxy)phenyl]fluorine; 9,9-bis[4-(2-hydroxyethoxy)-3-methyiphenyl]fluorine; 9,9-bis[4-(2-hydroxyethoxy)-3,5-dimethyiphenyl]fluorine; 9,9-bis[4-(2-hydroxyethoxy)-3-ethyiphenyl]fluorine; 9,9-bis[4-(2-hydroxyethoxy)-3,5-diethyiphenyl]fluorine; 9,9-bis[4-(2-hydroxyethoxy)-3-propyiphenyl]fluorine; 9,9-bis[4-(2-hydroxyethoxy)-3,5-dipropyiphenyl]fluorine; 9,9-bis[4-(2-hydroxyethoxy)-3-isopropyiphenyl]fluorine; 9,9-bis[4-(2-hydroxyethoxy)-3,5-diisopropylphenyl]fluorine;] 9,9-bis[4-(2-hydroxyethoxy)-3-n-butylphenyl]fluorine; 9,9-bis[4-(2-hydroxyethoxy)-3,5-di-n-butylphenyl]fluorine; 9,9-bis[4-(2-hydroxyethoxy)-3-isobutyiphenyl]fluorine; 9,9-bis[4-(2-hydroxyethoxy)-3,5-di-isobutyiphenyl]fluorine; 9,9-bis[4-(2-hydroxyethoxy)-3-(1-methylpropyl)phenyl]fluorine; 9,9-bis[4-(2-hydroxyethoxy)-3,5-bis(1-methylpropyl)phenyl]fluorine; 9,9-bis[4-(2-hydroxyethoxy)-3-phenyiphenyl]fluorine; 9,9-bis[4-(2-hydroxyethoxy)-3,5-di]-phenylphenyl]fluorine; 9,9-bis[4-(2-hydroxyethoxy)-3-benzylphenyl]fluorine; 9,9-bis[4-(2-hydroxyethoxy)-3,5-di-benzylphenyl]fluorine; 9,9-bis[4-(3-hydroxypropoxy)phenyl]fluorine and 9,9-bis[4-(4-hydroxybutoxy)phenyl]fluorine.

5. The process according to claim 1, wherein the dihydroxy compound of the general formula (1) is 9,9-bis[4-(2-hydroxyethoxy)phenyl]fluorene.

6. The process according to claim 1, wherein the amount of the dihydroxy compound of formula (1) is 10 to 95 mole % of the dihydroxy compound component.

7. The process according to claim 2, wherein the alicyclic dicarboxylic acid is at least one compound selected from the group consisting of cyclohexane-dicarboxylic acid, decalin-dicarboxylic acid, norbomane-dicarboxylic acid, adamantane-dicarboxylic acid and tricyclodecene-dicarboxylic acid.

8. The process according to claim 2, wherein the dihydroxy compound of the general formula (1) is at least one member selected from the group consisting of 9,9-bis[4-(2-hydroxyethoxy)phenyl]fluorine; 9,9-bis[4-(2-hydroxyethoxy)-3-methylphenyl]fluorine; 9,9-bis[4-(2-hydroxyethoxy)-3,5-dimethylphenyl]fluorine; 9,9-bis[4-(2-hydroxyethoxy)-3-ethyiphenyl]fluorine; 9,9-bis[4-(2-hydroxyethoxy)-3,5-diethyiphenyl]fluorine; 9,9-bis[4-(2-hydroxyethoxy)-3-propyiphenyl]fluorine; 9,9-bis[4-(2-hydroxyethoxy)-3,5-dipropyiphenyl]fluorine; 9,9-bis[4-(2-hydroxyethoxy)-3-isopropyiphenyl]fluorine; 9,9-bis[4-(2-hydroxyethoxy)-3,5-diisopropylphenyl]fluorine;] 9,9-bis[4-(2-hydroxyethoxy)-3-n-butylphenyl]fluorine; 9,9-bis[4-(2-hydroxyethoxy)-3,5-di-n-butylphenyl]fluorine; 9,9-bis[4-(2-hydroxyethoxy)-3-isobutyiphenyl]fluorine; 9,9-bis[4-(2-hydroxyethoxy)-3,5-di-isobutyiphenyl]fluorine; 9,9-bis[4-(2-hydroxyethoxy)-3-(1-methylpropyl)phenyl]fluorine; 9,9-bis[4-(2-hydroxyethoxy)-3,5-bis(1-methylpropyl)phenyl]fluorine; 9,9-bis[4-(2-hydroxyethoxy)-3-phenyiphenyl]fluorine; 9,9-bis[4-(2-hydroxyethoxy)-3,5-di]-phenylphenyl]fluorine; 9,9-bis[4-(2-hydroxyethoxy)-3-benzylphenyl]fluorine; 9,9-bis[4-(2-hydroxyethoxy)-3,5-di-benzylphenyl]fluorine; 9,9-bis[4-(3-hydroxypropoxy)phenyl]fluorine and 9,9-bis[4-(4-hydroxybutoxy)phenyl]fluorine.

9. The process according to claim 2, wherein the dihydroxy compound of the general formula (1) is 9,9-bis[4-(2-hydroxyethoxy)phenyl]fluorene.

10. The process according to claim 2, wherein the amount of the dihydroxy compound of formula (1) is 10 to 95 mole % of the dihydroxy compound component.

11. The process according to claim 2, wherein the aromatic dicarboxylic acid is terephthalic acid, isophthalic acid, or their ester-forming derivatives.

* * * * *

UNITED STATES PATENT AND TRADEMARK OFFICE
CERTIFICATE OF CORRECTION

PATENT NO. : 7,538,176 B2
APPLICATION NO. : 10/547350
DATED : May 26, 2009
INVENTOR(S) : Michiaki Fuji et al.

It is certified that error appears in the above-identified patent and that said Letters Patent is hereby corrected as shown below:

Claim 3- column 23, line 58, please amend "norbomane-dicarboxylic acid" to read "norbornane-dicarboxylic acid".

Claim 4- column 23, line 64, please amend "fluorine" to read "fluorene";

column 23, lines 64-65, please amend "methyiphenyl]fluorine" to read "methylphenyl]fluorene";

column 24, line 1, please amend "ethyiphenyl]fluorine" to read "ethylphenyl]fluorene";

column 24, line 2, please amend "ethyiphenyl]fluorine" to read "ethylphenyl]fluorene";

column 24, line 3, please amend "diethyiphenyl]fluorine" to read "diethylphenyl]fluorene";

column 24, line 4, please amend "propyiphenyl]fluorine" to read "propylphenyl]fluorene";

column 24, line 5, please amend "dipropyiphenyl]fluorine" to read "dipropylphenyl]fluorene";

column 24, line 6, please amend "isopropyiphenyl]fluorine" to read "isopropylphenyl]fluorene";

column 24, line 7, please amend "fluorine" to read "fluorene";

column 24, line 8, please amend "fluorine" to read "fluorene";

column 24, line 9, please amend "fluorine" to read "fluorene";

column 24, line 10, please amend "isobutyiphenyl]fluorine" to read "isobutylphenyl]fluorene";

column 24, line 11, please amend "di-isobutyiphenyl]fluorine" to read "di-isobutylphenyl]fluorene";

UNITED STATES PATENT AND TRADEMARK OFFICE
CERTIFICATE OF CORRECTION

PATENT NO.       : 7,538,176 B2
APPLICATION NO.  : 10/547350
DATED            : May 26, 2009
INVENTOR(S)      : Michiaki Fuji et al.

It is certified that error appears in the above-identified patent and that said Letters Patent is hereby corrected as shown below:

Claim 4-  column 24, line 12, please amend "fluorine" to read "fluorene";

column 24, line 13, please amend "fluorine" to read "fluorene";

column 24, line 14, please amend "fluorine" to read "fluorene";

column 24, line 15, please amend "di]-phenylphenyl]fluorine" to read "di-phenylphenyl]fluorene";

column 24, line 16, please amend "fluorine" to read "fluorene";

column 24, line 17, please amend "fluorine" to read "fluorene";

column 24, line 18, please amend "fluorine" to read "fluorene"; and     column 24, line 19, please amend "fluorine" to read "fluorene".

Claim 7-  column 24, line 29, please amend "norbomane-dicarboxylic" to read "norbornane-dicarboxylic".

Claim 8-  column 24, line 34, please amend "fluorine" to read "fluorene";

column 24, line 35, please amend "fluorine" to read "fluorene";

column 24, line 36, please amend "fluorine" to read "fluorene";

column 24, line 37, please amend "ethyiphenyl]fluorine" to read "ethylphenyl]fluorene";

column 24, line 38, please amend "diethyiphenyl]fluorine" to read "diethylphenyl]fluorene";

column 24, line 39, please amend "propyiphenyl]fluorine" to read "propylphenyl]fluorene";

column 24, line 40, please amend "dipropyiphenyl]fluorine" to read "dipropylphenyl]fluorene";

column 24, line 41, please amend "isopropyiphenyl]fluorine" to read "isopropylphenyl]fluorene";

UNITED STATES PATENT AND TRADEMARK OFFICE
CERTIFICATE OF CORRECTION

PATENT NO. : 7,538,176 B2
APPLICATION NO. : 10/547350
DATED : May 26, 2009
INVENTOR(S) : Michiaki Fuji et al.

It is certified that error appears in the above-identified patent and that said Letters Patent is hereby corrected as shown below:

Claim 8- column 24, line 42, please amend "fluorine" to read "fluorene";

column 24, line 43, please amend "fluorine" to read "fluorene";

column 24, line 44, please amend "fluorine" to read "fluorene";

column 24, line 45, please amend "isobutyiphenyl]fluorine" to read "isobutylphenyl]fluorene";

column 24, line 46, please amend "di-isobutyiphenyl]fluorine" to read "di-isobutylphenyl]fluorene";

column 24, line 47, please amend "fluorine" to read "fluorene";

column 24, line 48, please amend "fluorine" to read "fluorene";

column 24, line 49, please amend "fluorine" to read "fluorene";

column 24, line 50, please amend "di]-phenylphenyl]fluorine" to read "di-phenylphenyl]fluorene";

column 24, line 51, please amend "fluorine" to read "fluorene";

column 24, line 52, please amend "fluorine" to read "fluorene";

column 24, line 53, please amend "fluorine" to read "fluorene"; and column 24, line 54, please amend "fluorine" to read "fluorene".

Signed and Sealed this

Tenth Day of November, 2009

David J. Kappos
*Director of the United States Patent and Trademark Office*